United States Patent
Sakai

(10) Patent No.: US 10,198,234 B2
(45) Date of Patent: Feb. 5, 2019

(54) METHOD FOR SETTING COLOR TEMPERATURE OF DISPLAY DEVICE, DISPLAY SYSTEM, PROGRAM FOR SETTING COLOR TEMPERATURE OF DISPLAY, AND METHOD FOR DETERMINING COLOR TEMPERATURE OF DISPLAY

(71) Applicant: EIZO Corporation, Ishikawa (JP)

(72) Inventor: Yoshikazu Sakai, Ishikawa (JP)

(73) Assignee: EIZO Corporation, Ishikawa (JP)

(\*) Notice: Subject to any disclaimer, the term of this patent is extended or adjusted under 35 U.S.C. 154(b) by 179 days.

(21) Appl. No.: 15/516,476

(22) PCT Filed: Sep. 16, 2015

(86) PCT No.: PCT/JP2015/076208
§ 371 (c)(1),
(2) Date: Apr. 3, 2017

(87) PCT Pub. No.: WO2016/052180
PCT Pub. Date: Apr. 7, 2016

(65) Prior Publication Data
US 2018/0277055 A1    Sep. 27, 2018

(30) Foreign Application Priority Data
Oct. 3, 2014    (JP) ................ 2014-205127

(51) Int. Cl.
*G09G 5/02* (2006.01)
*G09G 5/10* (2006.01)
(Continued)

(52) U.S. Cl.
CPC .......... *G06F 3/1423* (2013.01); *G06F 3/1446* (2013.01); *G09G 5/02* (2013.01);
(Continued)

(58) Field of Classification Search
CPC ... G09G 2320/0666; G09G 2320/0693; G09G 2320/0242; G09G 2320/0626;
(Continued)

(56) References Cited

U.S. PATENT DOCUMENTS 4,931,856 A    6/1990    Hieda et al.
2003/0095138 A1    5/2003    Kim et al.
(Continued)

FOREIGN PATENT DOCUMENTS

CN    1996442 A    7/2007
CN    101154351 A    4/2008
(Continued)

OTHER PUBLICATIONS

Office Action dated Jul. 25, 2018 in corresponding Chinese Application No. 201580053389.9; 11 pages including English-language translation.
(Continued)

*Primary Examiner* — Darlene M Ritchie
(74) *Attorney, Agent, or Firm* — Maier & Maier, PLLC

(57) ABSTRACT

By setting the color temperatures of displays included in a display system to a desired value, the life of the displays and display system is extended. A method for this includes acquiring outputable maximum luminances of the displays at each of multiple color temperatures, comparing the outputable maximum luminances of the displays at the same color temperature and determining the lowest maximum luminance value for each of the color temperatures, a color temperature corresponding to the highest of the lowest maximum luminance values identified for each of the color temperatures, and setting color temperatures of at least two of the displays to the common set color temperature.

4 Claims, 6 Drawing Sheets

(51) Int. Cl.
*G09G 5/14* (2006.01)
*G06F 3/14* (2006.01)
*H04N 9/73* (2006.01)

(52) U.S. Cl.
CPC ............. *G09G 5/10* (2013.01); *H04N 9/73* (2013.01); *G09G 5/14* (2013.01); *G09G 2300/023* (2013.01); *G09G 2300/026* (2013.01); *G09G 2320/0276* (2013.01); *G09G 2320/043* (2013.01); *G09G 2320/0626* (2013.01); *G09G 2320/0666* (2013.01); *G09G 2320/0693* (2013.01); *G09G 2360/04* (2013.01); *G09G 2360/145* (2013.01); *G09G 2360/16* (2013.01)

(58) Field of Classification Search
CPC ....... G09G 2320/0276; G09G 2320/04; G09G 2320/043; G09G 3/006; G09G 3/2003; G09G 3/3413; G09G 2360/145; G09G 2360/144; G09G 2360/16; G09G 2360/04; G09G 2300/026; G09G 2300/023; G09G 5/02; G09G 5/10; G09G 5/14; G06F 3/1446; G06F 3/1423; H04N 9/73
See application file for complete search history.

(56) References Cited

U.S. PATENT DOCUMENTS

| | | | |
|---|---|---|---|
| 2004/0032534 A1 | 2/2004 | Fujino | |
| 2006/0007240 A1 | 1/2006 | Herbert et al. | |
| 2007/0132997 A1* | 6/2007 | Chuang | G01J 3/02 356/402 |
| 2012/0038660 A1* | 2/2012 | Han | G09G 3/2003 345/590 |
| 2013/0120589 A1* | 5/2013 | Chang | H04N 9/69 348/189 |
| 2013/0257895 A1 | 10/2013 | Iwafuchi et al. | |
| 2013/0293599 A1 | 11/2013 | Wakisaka et al. | |
| 2014/0071187 A1* | 3/2014 | Matsui | G09G 3/20 345/690 |
| 2014/0152706 A1* | 6/2014 | Park | G09G 3/2003 345/690 |
| 2014/0232614 A1* | 8/2014 | Kunkel | H04N 9/67 345/1.1 |
| 2015/0222866 A1 | 8/2015 | Lin | |

FOREIGN PATENT DOCUMENTS

| | | |
|---|---|---|
| CN | 101600120 A | 12/2009 |
| CN | 203013212 U | 6/2013 |
| CN | 103414905 A | 11/2013 |
| JP | S58-124390 A | 7/1983 |
| JP | 2000-069497 A | 3/2000 |
| JP | 2003-061110 A | 2/2003 |
| JP | 2007-019914 A | 1/2007 |
| JP | 2007-133298 A | 5/2007 |
| JP | 2008-151838 A | 7/2008 |
| JP | 2008-310261 A | 12/2008 |
| JP | 2009-159372 A | 7/2009 |
| JP | 2009-162946 A | 7/2009 |
| JP | 2009-237240 A | 10/2009 |
| JP | 2012-173669 A | 9/2012 |
| JP | 2013126044 A | 6/2013 |
| JP | 2013-207409 A | 10/2013 |
| WO | 2012/099157 A1 | 7/2012 |
| WO | 2013/088780 A1 | 6/2013 |

OTHER PUBLICATIONS

Extended European Search Report dated Jul. 19, 2017, including the Supplementary European Search Report and the European Search Opinion, in connection with corresponding EP Application No. 15846177.2 (7 pgs.).

International Search Report dated Dec. 28, 2015 in corresponding Application No. PCT/JP2015/076208; 2 pgs.

* cited by examiner

LML : LOWEST MAXIMUM LUMINANCE VALUE (cd/m²)   CSCT : COMMON SET COLOR TEMPERATURE

| COLOR TEMPERATURE | OUTPUTABLE MAXIMUM LUMINANCE(cd/m²) | | | |
|---|---|---|---|---|
| | DISPLAY No. 1 | DISPLAY No. 2 | DISPLAY No. 3 | DISPLAY No. 4 |
| 5000K | *410* | 420 | 430 | 450 |
| 6000K | 540 | 580 | *470* | 520 |
| 7000K | 560 | *430* | 450 | 580 |
| 7500K (RECOMMENDED) | 550 | 500 | 650 | *450* |
| 8000K | 530 | 590 | *520* | 540 |

(a2)

| LML(cd/m²) |
|---|
| 410 |
| 470 |
| 430 |
| 450 |
| *520* |

(a3)

| CSCT |
|---|
| 8000K |

| COLOR TEMPERATURE | OUTPUTABLE MAXIMUM LUMINANCE(cd/m²) | | | |
|---|---|---|---|---|
| | DISPLAY No. 1 | DISPLAY No. 2 | DISPLAY No. 3 | DISPLAY No. 4 |
| 5000K | 410 | 420 | 430 | *450* |
| 6000K | *540* | 580 | 470 | 520 |
| 7000K | 560 | 430 | 450 | *580* |
| 7500K (RECOMMENDED) | 550 | 500 | *650* | 450 |
| 8000K | 530 | *590* | 520 | 540 |

(b2)

| HML(cd/m²) |
|---|
| 450 |
| 540 |
| 580 |
| *650* |
| 590 |

(b3)

| CSCT |
|---|
| 7500K |

HML : HIGHEST MAXIMUM LUMINANCE VALUE (cd/m²)   CSCT : COMMON SET COLOR TEMPERATURE

FIG. 6A

AML: AVERAGE MAXIMUM LUMINANCE VALUE (cd/m²)  CSCT: COMMON SET COLOR TEMPERATURE (a)

(a1)

| COLOR TEMPERATURE | OUTPUTABLE MAXIMUM LUMINANCE(cd/m²) | | | |
|---|---|---|---|---|
| | DISPLAY No. 1 | DISPLAY No. 2 | DISPLAY No. 3 | DISPLAY No. 4 |
| 5000K | 410 | 420 | 430 | 450 |
| 6000K | 640 | 580 | 470 | 520 |
| 7000K | 560 | 430 | 450 | 580 |
| 7500K (RECOMMENDED) | 550 | 500 | 650 | 450 |
| 8000K | 530 | 590 | 520 | 540 |

(a2) AML(cd/m²)
427.5
552.5
505
537.5
545

(a3) CSCT
6000K

| COLOR TEMPERATURE | OUTPUTABLE MAXIMUM LUMINANCE(cd/m²) | | | |
|---|---|---|---|---|
| | DISPLAY No. 1 | DISPLAY No. 2 | DISPLAY No. 3 | DISPLAY No. 4 |
| 5000K | 410 | 420 | 430 | 450 |
| 6000K | 640 | 580 | 470 | 520 |
| 7000K | 560 | 430 | 450 | 580 |
| 7500K (RECOMMENDED) | 550 | 500 | 650 | 450 |
| 8000K | 530 | 590 | 520 | 540 |

(b2) MLS(cd/m²)
17.0783
73.6546
75.9386
85.3913
31.0913

(b3) CSCT
5000K

MLS: MAXIMUM LUMINANCE STANDARD DEVIATION (cd/m²)  CSCT: COMMON SET COLOR TEMPERATURE

METHOD FOR SETTING COLOR TEMPERATURE OF DISPLAY DEVICE, DISPLAY SYSTEM, PROGRAM FOR SETTING COLOR TEMPERATURE OF DISPLAY, AND METHOD FOR DETERMINING COLOR TEMPERATURE OF DISPLAY

TECHNICAL FIELD

The present invention relates to a display color temperature setting method, display color temperature setting program, and display color temperature determination method that are applied to a display system consisting of a combination of multiple displays, and a display system.

BACKGROUND ART

To read an MRI image, CT image, x-ray image, or the like in a hospital, for example, a system in which multiple displays (monitors) are connected to one computer or a display system in which one or more displays are connected to each of multiple computers which are connected through a network is often installed in a reading room. In such a system, all displays are required to display images at the same luminance and same color temperature and therefore are typically of the same model.

It is commonly known that the continued use of a display causes changes in the color temperature and luminance. Such temporal changes vary from display to display (there are individual differences). The changes in color temperature and luminance due to the continued use may vary even among the same model of displays. To correct the temporal changes in all displays in the same system so that all the displays show images at the same luminance and same color temperature, the displays are subjected to tone correction called color calibration. In color calibration, the color temperature and maximum luminance of each display are adjusted to a recommended color temperature 7500 K and a recommended maximum luminance 400 cd/m$^2$, respectively, which are commonly believed to be appropriate for display.

There have been proposed various methods for performing color calibration among displays (for example, Patent Literatures 1 to 5).

CITATION LIST

Patent Literature

Patent Literature 1: Japanese Unexamined Patent Application Publication No. 2009-237240
Patent Literature 2: Japanese Unexamined Patent Application Publication No. 2009-159372
Patent Literature 3: Japanese Unexamined Patent Application Publication No. 2012-173669
Patent Literature 4: Japanese Unexamined Patent Application Publication No. 2007-133298
Patent Literature 5: Japanese Unexamined Patent Application Publication No. 2008-151838

SUMMARY OF INVENTION

Technical Problem

Primary importance has been placed on an idea of adjusting the color temperatures and luminances of display devices to specified values in a display system, and technologies have been developed based on this idea. However, technologies have not been developed based on an idea of maintaining the luminances of displays as long as possible to extend the life of the displays.

The present invention relates to a technology that maintains the luminances of displays in a display system as long as possible to extend the life of the displays.

Solution to Problem

The present invention provides a method for setting color temperatures of multiple displays included in a display system. The method includes acquiring outputable maximum luminances of the displays at each of multiple color temperatures, the outputable maximum luminances being maximum luminances that the displays are able to output at each of the color temperatures, comparing the outputable maximum luminances of the displays at an identical color temperature and determining the lowest maximum luminance value for each of the color temperatures, the lowest maximum luminance value being the lowest of the outputable maximum luminances, setting, as a common set color temperature, a color temperature corresponding to the highest of the lowest maximum luminance values identified for each of the color temperatures, and setting color temperatures of at least two of the displays to the common set color temperature.

The present invention also provides a display system including multiple displays, and a controller configured to control the displays. The controller acquires outputable maximum luminances of the displays at each of multiple color temperatures, the outputable maximum luminances being maximum luminances that the displays are able to output at each of the color temperatures, compares the outputable maximum luminances of the displays at an identical color temperature and identifies the lowest maximum luminance value for each of the color temperatures, the lowest maximum luminance value being the lowest of the outputable maximum luminances, sets, as a common set color temperature, a color temperature corresponding to the highest of the lowest maximum luminance values identified for each of the color temperatures, and sets color temperatures of at least two of the displays to the common set color temperature.

The present invention also provides a program for setting color temperatures of multiple displays included in a display system. The program causes a computer to perform a step of acquiring outputable maximum luminances of the displays at each of multiple color temperatures, the outputable maximum luminances being maximum luminances that the displays are able to output at each of the color temperatures, a step of comparing the outputable maximum luminances of the displays at the same color temperature and determining the lowest maximum luminance value for each of the color temperatures, the lowest maximum luminance value being the lowest of the outputable maximum luminances, a step of setting, as a common set color temperature, a color temperature corresponding to the highest of the lowest maximum luminance values identified for each of the color temperatures, and a step of setting color temperatures of at least two of the displays to the common set color temperature.

The present invention also provides a method for determining color temperatures of multiple displays included in a display system. The method includes acquiring outputable maximum luminances of the displays at each of multiple color temperatures, the outputable maximum luminances being maximum luminances that the displays are able to output at each of the color temperatures, comparing the outputable maximum luminances of the displays at the same color temperature and determining the lowest maximum luminance value for each of the color temperatures, the lowest maximum luminance value being the lowest of the outputable maximum luminances, and determining, as a common set color temperature, a color temperature corresponding to the highest of the lowest maximum luminance values identified for each of the color temperatures.

Advantageous Effects of the Invention

The display system of the present invention is able to increase the luminance life of the displays by setting the color temperatures of the displays to a desired value. Thus, the displays and the display system can extend the life thereof.

BRIEF DESCRIPTION OF THE DRAWINGS

FIG. 5 includes tables showing the concept of a final process of setting the color temperatures of the displays in the display system, in which FIG. 5A is a table showing a process of setting a color temperature using the lowest maximum luminance value;

FIG. 5B is a table showing a process of setting a color temperature using the highest maximum luminance value.

FIG. 6 includes tables showing the concept of a final process of setting the color temperatures of the displays in the display system, in which FIG. 6A is a table showing a process of setting a color temperature using the average maximum luminance value;

FIG. 6B is a table showing a process of setting a color temperature using the maximum luminance standard deviation.

DETAILED DESCRIPTION

Now, a preferred embodiment of a method for setting the color temperatures of displays (monitors) in a display system of the present invention will be described in detail with reference to FIGS. 1 to 6. While a case where the present embodiment is applied to liquid crystal displays is described below, the present embodiment can also be applied to cathode-ray tube (CRT) displays or the like. Also, while three primary colors, RGB, are described as an example of multiple colors, other types of colors may be used.

Figure 1:
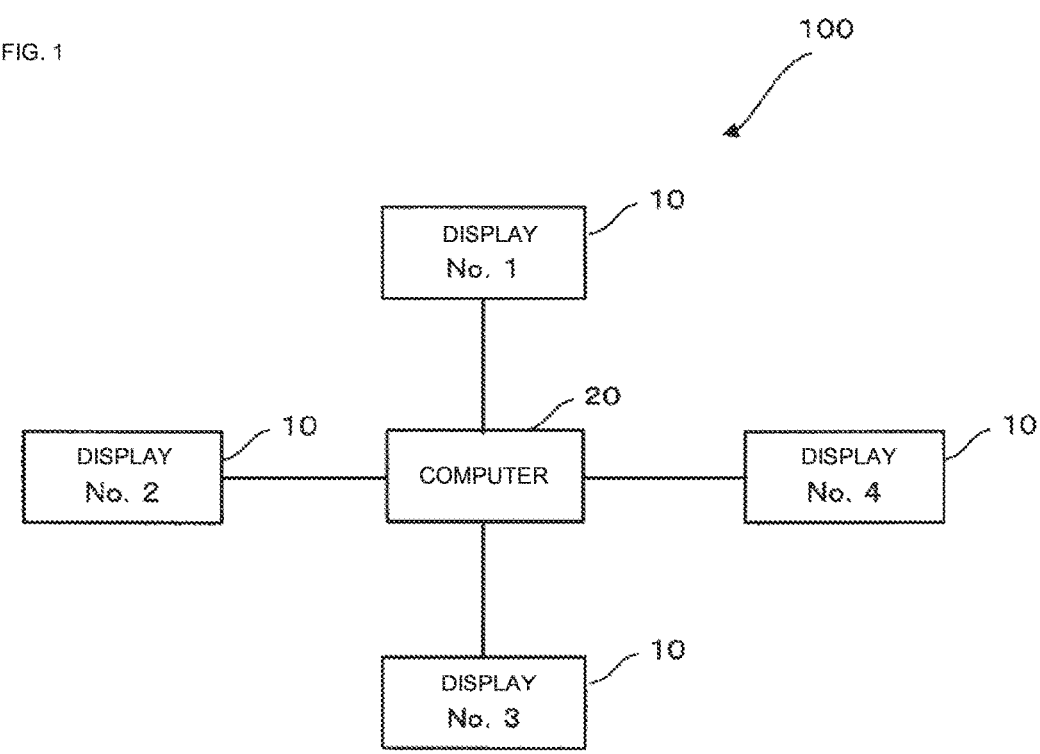
FIG. 1 shows a schematic block diagram of a display system to which the present invention is applied.

FIG. 1 shows an example of a display system 100 to which the present invention is applied. The display system 100 includes multiple displays 10 (four displays No.1 to No.4 in FIG. 1) and a computer (controller) 20 that centrally controls the displays 10.

Figure 2:
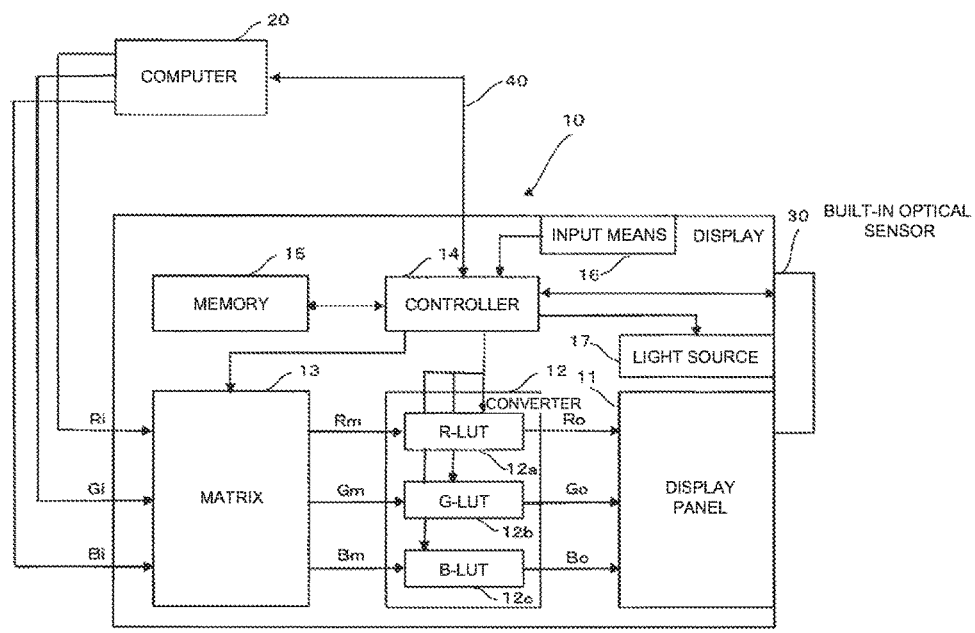
FIG. 2 shows a schematic block diagram of a computer and a display of an embodiment of the present invention.

FIG. 2 shows a schematic block diagram of a display 10 and the computer 20 for performing the color temperature setting method of the embodiment of the present invention. Unlike FIG. 1, FIG. 2 shows only one display 10 (e.g., the display No.1) and does not show the other displays. The computer 20 and a matrix 13 in the display 10 are connected through image signal lines for individual colors. The computer 20 and a controller 14 in the display 10 are connected through a communication line 40.

The display 10 includes a display panel 11 consisting of a common liquid crystal panel, a converter 12, the matrix 13, the controller [a central processing unit (CPU)] 14, a memory 15, input means 16, a light source (a backlight) 17, and a build-in optical sensor 30.

The matrix 13 consists of a component for converting color characteristics. It is, for example, a dedicated arithmetic operation circuit, but may be of any type. The matrix 13 receives RGB color image signals Ri, Gi, Bi from the computer 20 through the image signal lines, receives a control signal from the controller 14, and outputs color image signals Rm, Gm, Bm to the subsequent converter 12.

The converter 12 includes an R-look-up table (LUT) 12a, a G-LUT 12b, and a B-LUT 12c, which are gradation correction circuits corresponding to three primary color (RGB) image signals. The color image signals Rm, Gm, Bm outputted from the matrix 13 are inputted to the R-LUT 12a, G-LUT 12b, and B-LUT 12c, respectively. The converter 12 consists of an arithmetic operation circuit or the like, but may be of any type.

The R-LUT 12a, G-LUT 12b, and B-LUT 12c, which correspond to red, green, and blue, respectively, convert display input gradations L into corresponding display output gradations P and generate color image signals Ro, Go, Bo. A display input gradation L consists of, for example, 8 bits and can take 256 gradation values from 0 to 255. A display output gradation P consists of, for example, 10 bits and can take 1021 gradation values from 0 to 1020. For example, in the R-LUT 12a, display output gradations P (0, 4, 8, . . . 1012, 1016, 1020) correspond to display input gradations L (0, 1, 2, . . . 253, 254, 255). The R-LUT 12a converts gradations in accordance with this correspondence, that is, performs correction in accordance with the display characteristics of the display panel 11 (y correction). By making the bit number of a display output gradation P larger than that of a display input gradation L, more precise correction according to the display characteristics can be made.

In this way, the display characteristics of the display panel 11 are corrected (calibrated). Since the characteristics of the display panel 11, light source 17, or the like vary from product to product, it is preferred to correct the display characteristics on a product basis.

The R-LUT 12a, G-LUT 12b, and B-LUT 12c then outputs the color image signals Ro, Go, Bo to the display panel 11 so that an image having a density corresponding to the levels of the image signals is displayed on the display panel 11. The built-in optical sensor 30 measures the chromaticity (color temperature) and luminance of light emitted from the displayed image and transmits data about the obtained chromaticity and luminance to the controller 14.

The controller 14 compares the data about the chromaticity and luminance with target gradation characteristics and target chromaticity previously stored in the memory 15 (to be described later). The controller 14 then corrects the color characteristics by changing the set value of the matrix 13 and also corrects the gradation characteristics by changing the set values of the R-LUT 12a, G-LUT 12b, and B-LUT 12c. Connected to the controller 14 are the memory 15 that stores various types of setting information and input means 16 that is operable by the user. The memory 15 stores set values set at the time of production or values calculated by the controller 14. The input means 16 consists of keys, buttons, a touchscreen, or the like. By using the input means 16, the user can set the parameters of the displays 10 to any values.

The light source 17, which applies light to the display panel 11, consists of a cathode tube, light-emitting diode, or the like. It is typically called a backlight. The light source 17 includes a light-source controller consisting of, for example, a driver which controls the light-source current supplied to the light source by changing the frequency. The light source 17 thus configured is used in a transmission liquid crystal display. The controller 14 outputs a light-source control signal to the light-source controller on the basis of a control signal received from the PC 20 through the communication line 40. The light-source controller supplies a light-source current corresponding to the light-source control signal to the light source 17 to adjust the luminance of the light source 17.

The built-in optical sensor 30 is mounted so as to face the display screen of the display panel 11. Upon receipt of a control signal from the controller 14, the built-in optical sensor 30 is able to measure light emitted from the display panel 11. Specifically, the built-in optical sensor 30 is able to measure the white luminance of a white screen, the luminances (e.g., the absolute luminance values) of the RGB colors on the white screen, the chromaticity (color temperature), or the like. The built-in optical sensor 30 includes an R-filter, a G-filter, and a B-filter. It is able to split display light from the white screen as appropriate and to make measurements using the monochromatic luminance of each of the RGB colors as an absolute value.

Figure 3:
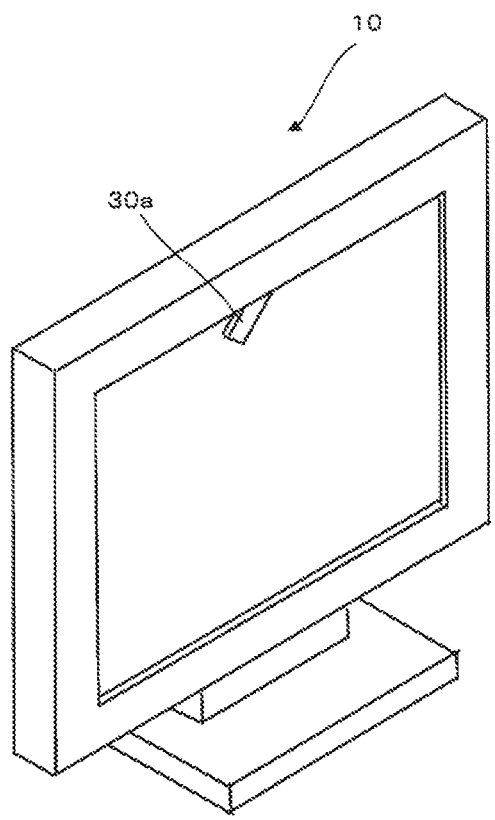
FIG. 3 is an external perspective view showing a state in which a built-in optical sensor protrudes out of a display.

FIG. 3 shows an example of a state in which the built-in optical sensor 30 protrudes out of a display 10. The built-in optical sensor 30 is disposed on one end of a tabular case 30a having an appropriate length in such a manner that the light-receiving surface thereof faces the display surface. The other end of the tabular case 30a is held by a rotary shaft disposed in an upper bezel of the display 10 in such a manner that the tabular case 30a can turn around the rotary shaft by about 45° along the display surface. When measuring the luminance or the like of emitted light, the built-in optical sensor 30 is moved from the bezel to a peripheral portion of the display surface so as to face the peripheral portion, by the drive of a DC motor (not shown) controlled by the controller 14. When making no measurement, the built-in optical sensor 30 is moved back from the display surface and housed in the bezel. Of course, an external optical sensor independent of the display 10 may be used in place of the built-in optical sensor 30. In this case, typically, an output from the external optical sensor is outputted to the computer 20, which then performs various arithmetic operations.

The computer 20 serving as a controller includes a central processing unit (not shown), a storage, an output device that transmits a control signal to the display 10, an input device with which the user inputs various instructions or data, and a display that displays images. The storage is able to store a color temperature setting program that performs various processes of the present invention. By providing a graphical user interface (GUI) environment in the display, the user can make various types of input, setting, or the like to the computer 20 through a window, dialog box, or the like as necessary.

Figure 4:
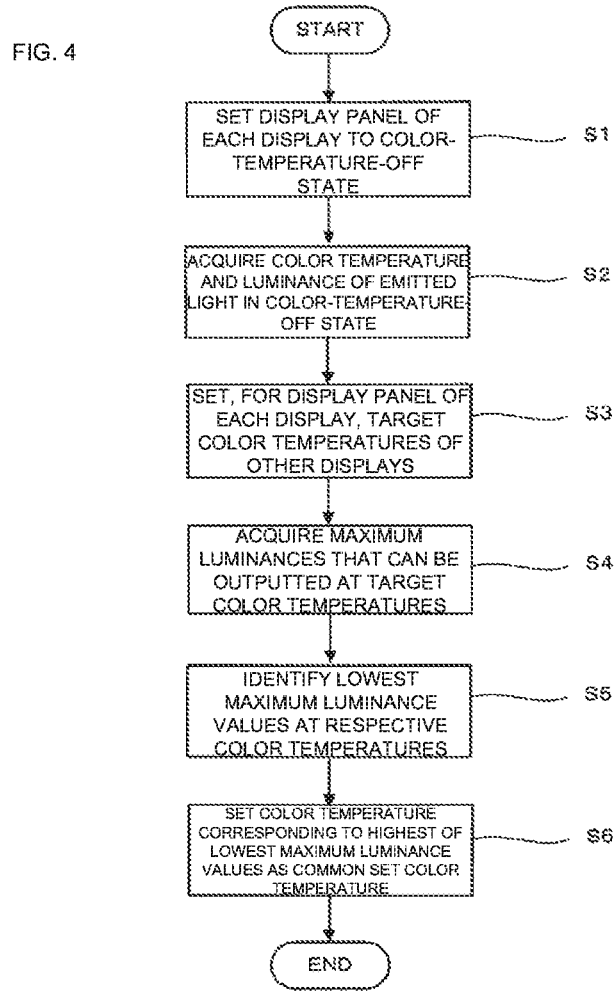
FIG. 4 is a flowchart showing the steps of a display color temperature setting method of the embodiment.

FIG. 4 is a flowchart showing the steps of a color temperature setting method of the embodiment of the present invention. After the user connects the display 10 to the computer 20 and starts the color temperature setting program of the computer 20, the computer 20 and display 10 performs the following steps. The following steps need not be performed in the order presented, and one step and another step may be performed in parallel as necessary.

<Step S1>

The computer 20 outputs control signals to the controllers 14 of the displays 10 of No.1 to No.4 through the communication line 40 to set the display panel 11 of each display to a color-temperature-off state, that is, to set each display panel 11 to a state in which R, G, and B are displayed at the maximum gradations (a native state). The term "color-temperature-off state" (native state) refers to a state in which the display 10 has not been subjected to color adjustment (a state called "direct matrix through"), and the color temperature in this state is defined as the target color temperature of the display 10 (see step S2).

<Step S2>

The controller 14 of each display receives the control signal from the computer 20, rewrites the matrix 13, and displays a white screen in the color-temperature-off state. The controller 14 then transmits a control signal to the light source 17 to maximize the luminance of the light source. The built-in optical sensor 30 acquires the then color temperature and luminance of light emitted from the display panel 11 and transmits them to the controller 14. The controller 14 transmits the color temperature and luminance received from the built-in optical sensor 30 to the computer 20 through the communication line 40. The acquired color temperature of the emitted light serves as the target color temperature of the display itself. The acquired luminance of the emitted light serves as the maximum luminance that the display itself is able to output at the target color temperature.

<Step S3>

Then, the computer 20 outputs control signals to the controllers 14 of the displays 10 of No.1 to No.4 through the communication line 40 to sequentially set, for the display panel 11 of each display, the target color temperatures of the other displays acquired in step S2 (that is, the color temperatures in the color-temperature-off state). Specifically, the computer 20 sequentially sets the target color temperatures of the displays No.2, No.3, No.4 for the display No.1; it sequentially sets the target color temperatures of the displays No.1, No.3, No.4 for the display No.2; it sequentially sets the target color temperatures of the displays No.1, No.2, No.4 for the display No.3; it sequentially sets the target color temperatures of the displays No.1, No.2, No.3 for the display No.4.

<Step S4>

The controller 14 of each display 10 receives the control signal from the computer 20 and acquires the maximum luminances that the display 10 is able to output when the target color temperatures of the respective displays 10 are set for the display 10 (outputable maximum luminances). Specifically, in each display 10, the controller 14 rewrites the matrix 13 for each of the target color temperatures of the respective displays, displays a white screen at each target color temperature, and maximizes the luminance of the light source 17, and the built-in optical sensor 30 acquires the color temperature and luminance of light emitted from the display panel 11 and transmits them to the controller 14. The controller 14 transmits all the color temperatures and luminances received from the built-in optical sensor 30 to the computer through the communication line 40.

In this way, the computer 20 acquires, with respect to each display, the maximum luminances at the four target color temperatures (the target color temperature of the display itself and the target color temperatures of the other three displays). While, in the present embodiment, the maximum luminances at all the target color temperatures are acquired by measuring them using the built-in optical sensor 30, other methods may be used. For example, only the maximum luminance at a certain color temperature may be acquired by measuring it, and the maximum luminances at the other color temperatures may be acquired by calculating them on the basis of various display characteristics data stored in the memory 15 of the display.

Table (a1) of FIG. 5A understandably shows the maximum luminances corresponding to the target color temperatures. In (a1) of FIG. 1, 5000 K, 6000 K, 7000 K, and 8000 K are the target color temperatures of the displays 10 of No.1 to No.4. In addition to these target color temperatures, this table also includes a typical recommended color temperature 7500 K. Note that there may be calculated the maximum luminances at predetermined particular color temperatures rather than at the target color temperatures of the displays 10 set as described above (that is, the color temperatures in a color-temperature-off state).

The maximum luminance of the display No.1 is 410 $cd/m^2$ at the color temperature 5000 K, 640 $cd/m^2$ at the color temperature 6000 K, 560 $cd/m^2$ at the color temperature 7000 K, 550 $cd/m^2$ at the recommended color temperature 7500 K, and 530 $cd/m^2$ at the color temperature 8000 K. Similarly, the maximum luminances of the other displays No.2, No.3, and No.4 at the respective color temperatures are measured. Of course, these maximum luminances (the outputable maximum luminances) are higher than a typical recommended maximum luminance (e.g., 400 $cd/m^2$).

<Step S5>

The computer 20 then identifies the lowest of the outputable maximum luminances of the displays No.1, No.2, No.3, No.4 at the respective color temperatures, that is, the lowest maximum luminance value. Specifically, as shown in Table (a2) of FIG. 5(a), the computer 20 identifies 410 $cd/m^2$ (the value of the display No.1) as the lowest maximum luminance value at the color temperature 5000 K, 470 $cd/m^2$ (the value of the display No.3) as the lowest maximum luminance value at the color temperature 6000 K, 430 $cd/m^2$ (the value of the display No.2) as the lowest maximum luminance value at the color temperature 7000 K, 450 $cd/m^2$ (the value of the display No.4) as the lowest maximum luminance value at the recommended color temperature 7500 K, and 520 $cd/m^2$ (the value of the display No.3) as the lowest maximum luminance value at the color temperature 8000 K.

The lowest maximum luminance value is an index identifying a display having the smallest difference with the recommended maximum luminance (400 $cd/m^2$) when operated at the respective target color temperatures, that is, a display having the smallest operation margin. For example, the display No.1 having the lowest maximum luminance value (410 $cd/m^2$) at the color temperature 5000 K has the smallest margin and therefore has the shortest life (luminance life) at this color temperature.

<Step S6>

Further, as shown in Table (a3) of FIG. 5A, the computer 20 identifies a color temperature corresponding to the highest of the identified lowest maximum luminance values at the respective color temperatures. Finally, the computer 20 sets this color temperature as a common set color temperature common to the displays No.1 to No.4. Specifically, the computer 20 transmits, to the respective displays, control signals including an instruction to set the common set color temperature, and the controller 14 of each display sets the color temperature of the display to the common set color temperature.

The color temperature obtained in the above process corresponds to one having the largest difference with the recommended maximum luminance, of the lowest maximum luminance values at the respective color temperatures. For this reason, by setting the color temperature of the display system 100 to the common set color temperature, the effect of extending the life of the display having the shortest luminance life is increased, and the luminance life of the entire display system 100 is extended.

In this example, the lowest maximum luminance value, 520 $cd/m^2$, of the display No.3 at the color temperature 8000 K has the largest difference with the recommended maximum luminance. Accordingly, the color temperature 8000 K is set as the common set color temperature of the display system 100. That is, the display No.3 has the lowest maximum luminance and shortest luminance life at the color temperature 8000 K serving as the common set color temperature. On the other hand, the maximum luminance, 520 $cd/m^2$, of the display No.3 at the color temperature 8000 K is always higher than the lowest maximum luminance values at the other color temperatures (e.g., 430 $cd/m^2$ of the display No.2 at 7000 K). Accordingly, the margin of the display No.3 having the shortest luminance life with respect to the recommended color temperature is always larger than those of the displays having the shortest luminance life at the other color temperatures (e.g., the display No.2 at 7000 K). Thus, the luminance life of the entire display system 100 is extended.

After setting the common set color temperature for the displays 10, the computer 20 and displays 10 perform conventional color calibration (tone correction) at the common set color temperature.

Among the methods for setting the color temperatures of the displays in the display system 100 are the above example, as well as modifications (1) to (3) below. In the modifications, the following methods are performed in place of steps S5 and S6 above.

(1) Modification Shown in FIG. 5B

The maximum luminance values in Table (b1) of FIG. 5B are the same as those in Table (a1) of FIG. 5A. In this example, the computer 20 identifies the highest of the maximum luminances that the displays No.1 to No.4 are able to output at the respective color temperatures, that is, the highest maximum luminance value. Specifically, as shown in Table (b2) of FIG. 8(b), the computer 20 identifies 450 $cd/m^2$ (the value of the display No.4) as the highest maximum luminance value at the color temperature 5000 K, 640 $cd/m^2$ (the value of the display No.1) as the highest maximum luminance value at the color temperature 6000 K, 580 $cd/m^2$ (the value of the display No.4) as the highest maximum luminance value at the color temperature 7000 K, 650 $cd/m^2$ (the value of the display No.3) as the highest maximum luminance value at the recommended color temperature 7500 K, and 590 $cd/m^2$ (the value of the display No.2) as the highest maximum luminance value at the color temperature 8000 K.

The highest maximum luminance value is an index identifying a display having the largest difference with the recommended maximum luminance (400 $cd/m^2$) when operated at the respective target color temperatures, that is, a display having the largest operation margin. For example, the display No.4 having the highest maximum luminance value (450 $cd/m^2$) at the color temperature 5000 K has the largest margin and therefore has the longest life (luminance life) at this color temperature.

Further, as shown in Table (b3) of FIG. 5B, the computer 20 identifies a color temperature corresponding to the highest of the identified highest maximum luminance values at the respective color temperatures. Finally, the computer 20 sets this color temperature as a common set color temperature common to the displays No.1 to No.4. Specifically, the computer 20 transmits, to the displays, control signals including an instruction to set the common set color temperature, and the controller 14 of each display sets the color temperature of the display to the common set color temperature.

The maximum luminance at the color temperature obtained in the above process is one having the largest difference with the recommended maximum luminance, of the highest maximum luminance values at the respective color temperatures. For this reason, by setting the color temperature of the display system 100 to the common set color temperature, the effect of extending the life of the display having the longest luminance life is increased, and the effect of extending the life of the display that may be able to obtain the longest luminance life is maximized.

In this example, the highest maximum luminance value, 650 cd/m$^2$, of the display No.3 at the recommended color temperature 7500 K has the largest difference with the recommended maximum luminance. Accordingly, 7500 K is set as the common set color temperature of the display system 100. That is, the display No.3 has the highest maximum luminance and the longest luminance life at the color temperature 7500 K serving as the common set color temperature. Further, the maximum luminance, 650 cd/m$^2$, of the display No.3 at the color temperature 7500 K is always higher than the highest maximum luminance values at the other color temperatures (e.g., 580 cd/m$^2$ of the display No.4 at 7000 K). Accordingly, the margin of the display No.3 having the longest luminance life with respect to the recommended color temperature is always larger than the displays having the longest luminance life at the other color temperatures (e.g., the display No.4 at 7000 K). As a result, the effect of extending the life of the display that originally may be able to obtain the longest luminance life in the display system 100 is maximized. In this case, the life of the other displays No.1, No.2, No.4, is not considered.

(2) Modification Shown in FIG. 6A

The maximum luminance values in Table (a1) of FIG. 6A are the same as those in Table (a1) of FIG. 5A. In this example, the computer 20 identifies the averages of the maximum luminances that the displays No.1, No.2, No.3, No.4 is able to output at the respective color temperatures, that is, identifies the average maximum luminance values. Specifically, as shown in Table (a2) of FIG. 6A, the computer 20 calculates 427.5 cd/m$^2$ as the average maximum luminance value at the color temperature 5000 K, 552.5 cd/m$^2$ as the average maximum luminance value at the color temperature 6000 K, 505 cd/m$^2$ as the average maximum luminance value at the color temperature 7000 K, 537.5 cd/m$^2$ as the average maximum luminance value at the recommended color temperature 7500 K, and 545 cd/m$^2$ as the average maximum luminance value at the color temperature 8000 K.

Further, as shown in Table (a3) of FIG. 6A, the computer 20 identifies a color temperature corresponding to the highest of the identified average maximum luminance values at the respective color temperatures and finally sets this color temperature as a common set color temperature common to the displays No.1 to No.4. In this example, the average maximum luminance value 552.5 cd/m$^2$ at the recommended color temperature 6000 K is higher than the average maximum luminance values at the other color temperatures. Accordingly, 6000 K is set as the common set color temperature of the display system 100. The computer 20 transmits, to the displays, control signals including an instruction to set the common set color temperature, and the controller 14 of each display sets the color temperature of the display to the common set color temperature.

By setting the color temperature of the display system 100 to the common set color temperature, the life of the displays can be extended approximately uniformly.

(3) Modification Shown in FIG. 6B

The maximum luminance values in Table (b1) of FIG. 6B are the same as those in Table (a1) of FIG. 5A. In this example, the computer 20 identifies the standard deviations of the maximum luminances that the displays No.1, No.2, No.3, No.4 are able to output at the respective color temperatures, that is, identifies the maximum luminance standard deviations. Specifically, as shown in Table (b2) of FIG. 6B, the computer 20 calculates 17.0783 cd/m$^2$ as the maximum luminance standard deviation at the color temperature 5000 K, 73.6546 cd/m$^2$ as the maximum luminance standard deviation at the color temperature 6000 K, 75.9386 cd/m$^2$ as the maximum luminance standard deviation at the color temperature 7000 K, 85.3913 cd/m$^2$ as the maximum luminance standard deviation at the recommended color temperature 7500 K, and 31.0913 cd/m$^2$ as the maximum luminance standard deviation at the color temperature 8000 K.

Further, as shown in Table (b3) of FIG. 6B, the computer 20 identifies a color temperature corresponding to the smallest of the identified maximum luminance standard deviations at the respective color temperatures and finally sets this color temperature as a common set color temperature common to the displays No.1 to No.4. In this example, the maximum luminance standard deviation 17.0783 cd/m$^2$ at the recommended color temperature 5000 K is smaller than the maximum luminance standard deviations at the other color temperatures. Accordingly, 5000 K is set as the common set color temperature of the display system 100. The computer 20 transmits, to the displays, control signals including an instruction to set the common set color temperature, and the controller 14 of each display sets the color temperature of the display to the common set color temperature.

By setting the color temperature of the display system 100 to the common set color temperature, variations in life between the displays are reduced, and all the displays become unusable approximately at the same timing. Accordingly, this timing can be managed as a guide timing for simultaneously replacing the displays in the display system.

While, in the above embodiment, the computer 20 is connected to the displays 10 through the communication line 40 and image signal lines as shown in FIG. 1, the computer 20 may be connected to the displays 10 or built-in optical sensors 30 in any form. For example, the computer 20 may be connected to the displays 10 through the wired or wireless Internet or LAN so as to be capable of communicating with them. This allows the user to operate the displays 10 from a distant place. Of course, the number of displays 10 need not be four.

In the above embodiment, the single computer 20 centrally controls the displays 10 of No.1 to No.4, as shown in FIG. 1. However, the computer 20 may have any configuration or may be disposed in any place as long as it is a controller that is able to centrally control the displays 10 of No.1 to No.4. For example, the controller may be disposed in any display 10. Also, the controller need not necessarily set the same color temperature for all the displays 10 of No.1 to No.4. It may set the same color temperature (the common set color temperature) for a required number of displays in accordance with the purpose. In other words, it only has to set the color temperatures of at least two displays 10 to the same value. A display color temperature setting program of the present invention may be disposed in any place or in any form and may be, for example, stored in the memory 15 of any display 10.

While, in the above embodiment, the single computer 20 centrally controls the displays 10 of No to No.4, as shown in FIG. 1, the present invention can also be applied to a display system in which one or more displays are connected to each of multiple computers which are connected through a network. In this case, anyone of the computers in the network representatively performs the above color temperature setting method through the computers.

While the color temperature setting method ending with the step of setting the color temperatures of multiple displays to the common set color temperature has been described in the embodiment, the present invention also includes a color temperature setting method ending with a step of determining a common set color temperature, which precedes a step of finally setting the common set color temperature.

The present invention is not limited to the above embodiment, and changes, improvements, or the like can be made thereto as necessary. The material, shape, size, value, form, number, position, or the like of each component of the embodiment may be any material or the like as long as the present invention can be realized.

INDUSTRIAL APPLICABILITY

According to the present invention, the color temperatures of displays in a display system are set to a desired value. Thus, the life of the displays and display system can be extended.

DESCRIPTION OF REFERENCE SIGNS

10: display
11: display panel
12: converter
12a: R-LUT
12b: G-LUT
12c: B-LUT
13: matrix
14: controller (CPU)
15: memory
16: input means
17: light source
20: computer (controller)
30: built-in optical sensor
40: communication line
100: display system

The invention claimed is:

1. A computer-implemented method for setting color temperatures of a plurality of displays included in a display system, the computer-implemented method comprising:
acquiring outputable maximum luminances of the displays at each of a plurality of color temperatures by measurement using corresponding built-in optical sensors or by calculation using a controller of the display, the outputable maximum luminances being maximum luminances that the displays are able to output at each of the color temperatures;
comparing the outputable maximum luminances of the displays at an identical color temperature and determining the lowest maximum luminance value for each of the color temperatures, the lowest maximum luminance value being the lowest of the outputable maximum luminances;
setting, as a common set color temperature, a color temperature corresponding to the highest of the lowest maximum luminance values identified for each of the color temperatures; and
setting color temperatures of at least two of the displays to the common set color temperature.

2. A display system comprising:
a plurality of displays; and
a controller configured to control the displays, wherein the controller acquires outputable maximum luminances of the displays at each of a plurality of color temperatures by measurement using corresponding built-in optical sensors or by calculation, the outputable maximum luminances being maximum luminances that the displays are able to output at each of the color temperatures, compares the outputable maximum luminances of the displays at an identical color temperature and identifies the lowest maximum luminance value for each of the color temperatures, the lowest maximum luminance value being the lowest of the outputable maximum luminances, sets, as a common set color temperature, a color temperature corresponding to the highest of the lowest maximum luminance values identified for each of the color temperatures, and sets color temperatures of at least two of the displays to the common set color temperature.

3. A computer including a processing unit and a non-transitory storage medium for storing a program for setting color temperatures of a plurality of displays included in a display system, the computer causing the program to perform:
a step of acquiring outputable maximum luminances of the displays at each of a plurality of color temperatures by measurement using corresponding built-in optical sensors or by calculation, the outputable maximum luminances being maximum luminances that the displays are able to output at each of the color temperatures;
a step of comparing the outputable maximum luminances of the displays at an identical color temperature and determining the lowest maximum luminance value for each of the color temperatures, the lowest maximum luminance value being the lowest of the outputable maximum luminances;
a step of setting, as a common set color temperature, a color temperature corresponding to the highest of the lowest maximum luminance values identified for each of the color temperatures; and
a step of setting color temperatures of at least two of the displays to the common set color temperature.

4. A computer-implemented method for setting color temperatures of a plurality of displays included in a display system, the computer-implemented method comprising:
acquiring outputable maximum luminances of the displays at each of a plurality of color temperatures by measurement using corresponding built-in optical sensors or by calculation using a controller of the display, the outputable maximum luminances being maximum luminances that the displays are able to output at each of the color temperatures;
comparing the outputable maximum luminances of the displays at an identical color temperature and determining the average maximum luminance value for each of the color temperatures, the average maximum luminance value being the average of the outputable maximum luminances;

determining, as a common set color temperature, a color temperature corresponding to the highest of the average maximum luminance values identified for each of the color temperatures; and setting color temperatures of at least two of the displays to the common set color temperature.

* * * * *